March 4, 1947.  S. J. ROSCH  2,416,955
HEAT RESISTANT ELECTRIC INSULATION COMPRISING
RUBBER AND CHLORINATED DIPHENYLS
Filed May 29, 1942
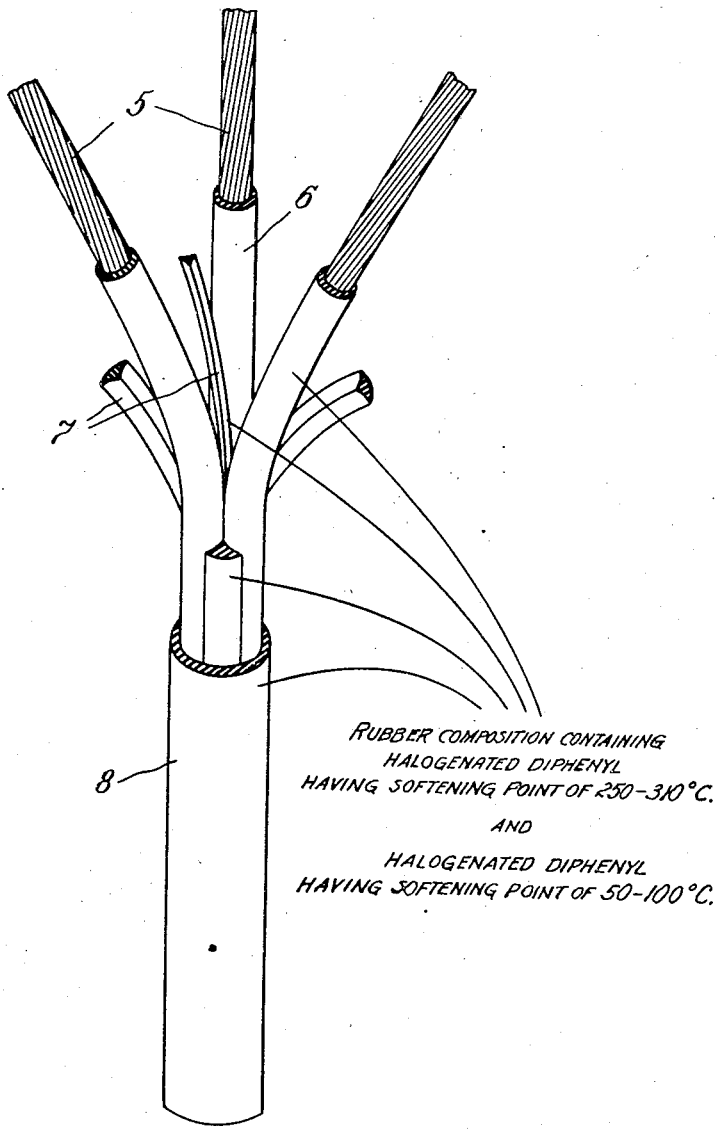
RUBBER COMPOSITION CONTAINING
HALOGENATED DIPHENYL
HAVING SOFTENING POINT OF 250-310°C.
AND
HALOGENATED DIPHENYL
HAVING SOFTENING POINT OF 50-100°C.
INVENTOR.
Samuel J. Rosch
BY
Pennie, Davis, Marvin & Edmonds
ATTORNEYS Patented Mar. 4, 1947

2,416,955

UNITED STATES PATENT OFFICE 2,416,955

HEAT-RESISTANT ELECTRIC INSULATION COMPRISING RUBBER AND CHLORINATED DIPHENYLS

Samuel J. Rosch, Yonkers, N. Y., assignor to Anaconda Wire and Cable Company, a corporation of Delaware Application May 29, 1942, Serial No. 445,067

7 Claims. (Cl. 260—3)

This invention provides an improved insulated electric conductor having as its insulation a novel heat-stable rubber composition. The invention particularly contemplates the provision of electric insulation, as for wires and cables, formed of the new heat-stable rubber composition, but the utility of the new composition is not limited to wire and cable insulation or to other electrical insulation uses.

The stability of rubber compositions at elevated temperatures is particularly important in connection with the use of such compositions for electrical insulation. Lack of heat stability of rubber compositions, for example, imposes a severe limitation upon the use of rubber-insulated wires and cables by lowering their safe current carrying capacity. No practical electrical conductor is theoretically perfect, and hence all practical conductors are heated to some extent by the passage of an electric current. The amount by which electrical conductors are thus heated increases with the amount of current carried thereby. Hence any insulation susceptible to injury by heat limits the safe current carrying capacity of the conductor to which it is applied.

Oxidation of rubber compositions is promoted by elevated temperatures, with resulting deterioration of the physical and electrical properties of the composition. It has therefore been proposed to protect rubber insulation compositions from deterioration by incorporating oxidation inhibitors therein. Oxidation inhibitors which are effective at normal temperatures or at only moderate elevated temperatures are both numerous and of a wide variety. Most of these oxidation inhibitors are effective and useful only at substantially normal temperatures for the reason either that they are capable of inhibiting only such oxidation as is promoted by normal temperatures, or for the reason that the inhibitors themselves are decomposed at elevated temperatures. Hence oxidation inhibitors generally do not provide effective protection against deleterious oxidation to overheated rubber compositions.

Overvulcanization of rubber compositions is also promoted by elevated temperatures. Overvulcanization causes deterioration of the physical and electrical properties of such compositions by transforming the composition from its desired state to either a hard and brittle form or to a soft putty-like form, depending largely upon the nature and choice of ingredients used in making up the composition. Rubber compositions are conventionally vulcanized by heating to a temperature of about 135° C. for a period of about two hours. Substantially the same degree of vulcanization can be obtained by heating the rubber compositions to a temperature of about 100° C. for a period of about 16-18 hours. Hence prolonged use of ordinary rubber insulation on conductors heated to about 100° C. can cause serious damage by overvulcanization. Means have been proposed and used for inhibiting overvulcanization but have limited applicability restricted to moderate temperature over a rather short period of time.

In electric distribution systems using wires or cables provided with insulation comprising a rubber composition, it is important that the insulation be capable of withstanding elevated temperatures without deterioration of its physical condition or loss of its insulating properties. Failure of one part of a cable system, for example, requires assumption by the balance of the system of the load ordinarily taken by the part which failed if a substantially constant load must be carried by the system. Such overloads, which may be caused by a failure of one part of a system or by emergency requirements for unusually large blocks of power, may last for only a few hours or a few days, or may last for several weeks, depending on the cause of the overload and the difficulty of correcting it. The increased load on the cables raises the operating temperature of the overloaded conductors to values frequently far in excess of the temperature recognized as safe for rubber insulating compositions.

The best rubber insulating compounds known to the industry today are rated as capable of continuous operation at a maximum safe temperature of about 75° C. The industry considers it safe to operate conductors insulated with such compositions at a maximum short-time temperature of 100° C. for not more than a total of one week per year. However, a period of one week (168 hours) is approximately 10 times as long as the time (16-18 hours) required to vulcanize rubber compostions at a temperature of 100° C., so heating the rubber insulation to 100° C. for such a period in effect is equivalent to a tenfold overvulcanization.

So-called "heat resistant" rubber compositions as proposed or produced heretofore have included oxidation inhibitors to impart oxidation resistance, and other inhibitors to deter overvulcanization at elevated temperatures. In addition, chlorinated diphenyls, either liquid or solid, containing about 40–60% by weight of chlorine and having relatively low melting or softening points (A. S. T. M.) below about 65° C., have been proposed and used in conjunction with halogenated naphthalenes to impart flame resistance to rubber insulating compositions. However, none of the compositions proposed heretofore has been capable of continuous operation at a temperature above about 75° C.

I have now discovered that by means of a novel combination of additional ingredients a rubber composition can be produced which is resistant to oxidation, overvulcanization, and other deleterious effects of prolonged overheating to such an extent that it is capable, in the form of insulation on a cable, of continuous safe operation at temperatures upwards of 75° C. and up to about 90° C. In fact, such rubber compositions have withstood operation at a temperature of 125° C. for periods of 300 hours without serious impairment of their physical or insulating properties An insulated electric conductor in accordance with my invention and embodying the foregoing discovery comprises a metallic conductor having insulation comprising a rubber composition of the invention. The rubber composition of my invention, which has a wide field of applicability but which is particularly valuable as insulation for electric cable, comprises a rubber composition containing in intimate association therewith a halogenated diphenyl having a softening point upwards of 250° C. and a plasticizer. The halogenated diphenyl advantageously is a chlorinated diphenyl, and advantageously has a softening point in the range 275° C. to 310° C. The plasticizer may with advantage be a halogenated diphenyl of low softening point in the range 50° C. to 100° C.

Any suitable rubber composition may be used as the base for the new heat-stable compositions according to my invention. When such rubber compositions are used in accordance with the invention as insulation for electric cables and the like, the rubber base to which the high softening point halogenated diphenyl is added should be one having the desired insulating qualities. Although the rubber compositions of my invention retain their desirable physical properties without degradation at much higher temperatures than has been possible heretofore, the maximum temperature which the compositions of the invention may withstand varies to some extent with the maximum temperature which the rubber compound is capable of withstanding without incorporating therein of a high softening point halogenated diphenyl in accordance with the invention.

Halogenated diphenyls may be produced having consistencies ranging from liquids to hard, brittle substances at normal temperature. Most commercially available chlorinated diphenyls, containing from about 40% to about 65% chlorine, have consistencies ranging from viscous liquids to resinous solids, and have softening points (A. S. T. M.) not much in excess of about 65° C. However, true halogenated diphenyls, such, for example, as chlorinated diphenyls, containing up to about 70% chlorine have been produced with softening points up to 300° C. or somewhat higher. In this specification halogenated diphenyls having softening points up to about 100° C. are classified as halogenated diphenyls having low softening points, and halogenated diphenyls having softening points from about 250° C. upwards to 300° C. or 310° C. are classified as halogenated diphenyls having high softening points. The halogenated products known by the trade-name "Arochlors" are available both in the class of low softening point products and in the class of high softening point products. For example, "Arochlor 4465" has a relatively low softening point (A. S. T. M.) of about 60–66° C., "Arochlor 2565" also has a relatively low softening point of about 70–77° C. and "Arochlor 1270" has a high softening point of about 294–300° C.

The high softening point halogenated diphenyls employed in accordance with the invention comprise halogenated diphenyls having a softening point (A. S. T. M.) upwards of about 250° C. and advantageously in the range 275° C. to 310° C. The chlorinated diphenyl known as "Arochlor 1270," comprising a true chlorinated diphenyl containing about 70% by weight of chlorine and having a softening point (A. S. T. M.) of 294–300° C., is particularly effective when used in accordance with my invention.

I have found that by incorporating an effective amount of such a high softening point halogenated diphenyl in a rubber composition, the resulting rubber composition is exceptionally stable at elevated temperatures. Rubber compositions containing in intimate association therewith a high softening point halogenated diphenyl of the type described hereinabove retain their original physical properties without any substantial degradation to a degree far greater than the best so-called heat-resistant rubber compositions known heretofore. Not only are the physical properties of the rubber compositions of my invention retained at high temperatures but the insulating properties of such compositions are also retained even after prolonged heating at temperatures far above those at which rubber composition known heretofore will deteriorate. Thus, rubber compositions of my invention are capable of withstanding heating to a temperature of about 90° C., or even higher, for an indefinite period of time without deterioration of their physical or electrical properties. Such rubber compositions are capable of withstanding heating to a temperature of about 125° C. continuously for at least two weeks without any serious degradation of its physical or electrical properties.

The amount of high softening point halogenated diphenyl incorporated in a rubber composition in accordance with my invention ranges advantageously from about 5% to about 30% by weight of the rubber composition. The use of about 10% to about 25% by weight of a high softening point halogenated diphenyl is particularly advantageous. The effectiveness of the high softening point halogenated diphenyls in imparting to the rubber compositions flame-resistance, oxidation-resistance and stability at elevated temperatures increases to a marked extent with the use of increasing amounts of the high softening point halogenated diphenyls. Substantially maximum effectiveness per unit weight of the high softening point halogenated diphenyls appears to fall within the range of about 15%, or better 18%, to about 25% by weight of the rubber composition.

Although the high softening point halogenated diphenyls impart to rubber compositions an exceptional thermal stability at unprecedentedly high temperatures, these high softening point products, which in general are hard crystalline powders, tend to stiffen the rubber compositions in which they are incorporated to an extent that is often greater than can be tolerated. For example, the optimum amount of high-softening point diphenyl generally increases the stiffness and brittleness of the composition to such an extent that it does not meet the requirements of flexibility often imposed on flexible wire and cable insulation. I have found that plasticizers incorporated in the rubber composition of my invention are capable of restoring the flexibility of these compositions without substantially impairing the heat-stability imparted by the high softening point halogenated diphenyl. Conventional plasticizers may be used for this purpose, the amount of such plasticizers being dependent upon the degree of flexibility desired and also upon the effectiveness of the plasticizer in the exercise of its plasticizing function. The proper amount of plasticizer to be used in accordance with my invention may be readily ascertained by simple experimentation, but in general from about 2% to about 12 or 15% of the plasticizer by weight of the rubber composition is satisfactory.

The plasticizer used in accordance with the invention may be merely a plasticizer for the rubber composition itself. However, I have found that if the plasticizer exerts a plasticizing effect on the high softening point halogenated diphenyl not only the flexibility of the rubber composition is increased but dispersion of the high softening point halogenated diphenyl is facilitated with the result that the effectiveness of the halogenated diphenyl is markedly increased. I have discovered that low softening point halogenated diphenyls having softening points in the range 50° C. to 100° C. and advantageously in the narrower range of 55° or 60° C. to 90° C. are particularly desirable as plasticizers. They complement the high softening point halogenated diphenyls, and may even somewhat increase the effectiveness of the high softening point halogenated diphenyls in imparting thermal stability and especially flame-resistance to rubber compositions. I have found that a solid chlorinated diphenyl having a softening point of about 70–77° C., available from Monsanto Chemical Co. under the trade designation "Arochlor 2565," is particularly effective as a plasticizer when used in an amount from about 2% to about 15%, or better from about 5% to about 10%, by weight of the rubber composition. Rubber compositions produced in accordance with my invention having from about 1 to about 9 or 10 parts of low softening point halogenated diphenyl to 10 parts of high softening point halogenated diphenyl are characterized by flame-resistance, oxidation resistance and general thermal stability to a higher degree than compositions known heretofore, and by flexibility such as to make the compositions particularly desirable for use as cable insulation.

In making up rubber compositions in accordance with the invention, the use of from about 9% to about 22%, or better about 12% to about 18%, of a suitable rubber is used. Fillers such as about 10–25% of zinc oxide and about 15–30% of clay are mixed or milled with rubber in the usual manner. Suitable accelerators and antioxidants used in conventional rubber compositions also are used with advantage. Thus, typical rubber compounds according to my invention may have the following approximate compositions, although it is understood that the invention is not specifically limited thereto:

| | Parts |
|---|---|
| Rubber | 20 to 30 |
| Zinc oxide | 20 to 30 |
| Clay | 25 to 35 |
| High softening point halogenated diphenyl | 10 to 20 |
| Low softening point halogenated diphenyl (or other plasticizer) | 3 to 8 |
| Accelerator and antioxidant | 2 to 3 |

The high softening point halogenated diphenyl and the plasticizer may be incorporated readily in the rubber composition by adding the desired amounts of these materials during mixing or milling of the other ingredients of the rubber composition. Intimate contact between the high softening point halogenated diphenyl and the rubber is the ultimate goal of the milling operation as far as the additions of my invention are concerned. This intimate contact is promoted by the use of a plasticizer which will plasticize the high softening point halogenated diphenyl, a low softening point solid halogenated diphenyl being particularly advantageous for this purpose. In any event, the period of conventional mixing or milling operation should be generally sufficient to obtain satisfactory dispersion of the high softening point halogenated diphenyl throughout the mass of the rubber composition.

The following illustration will demonstrate the unusual and unexpected thermal stability of a rubber composition made in accordance with my invention. The rubber composition was compounded from smoked sheet, zinc oxide, clay, accelerator and antioxidant, together with a chlorinated diphenyl ("Arochlor 1270") having a softening point of 294–300° C. and a chlorinated diphenyl ("Arochlor 2565") having a softening point of 70–77° C., each of the ingredients being present in an amount within the range set forth in the preceding example of suitable compositions. This rubber composition was used as insulation for a three conductor cable, each conductor having an area of 250,000 circular mils and each conductor being insulated with approximately 80 mils of the rubber composition. The individual conductors were insulated with the same rubber composition modified only by the use of colored pigments to provide red, white and gray colored conductors for polarity identification. The three insulated conductors were vulcanized, then cabled together with inserts of the same rubber composition and with a cover or jacket of synthetic rubber composition. The assembled cable was again vulcanized to effect vulcanization of the cable jacket, and thus the insulating rubber composition of the individual conductors was subjected to a second vulcanization.

The single figure of the accompanying drawing illustrates this three conductor cable. The rubber composition 6 insulates each of the individual conductors 5, and the insulated conductors are cabled together with inserts 7 and a cover 8 of the same rubber composition.

A fifty foot length of the thus completed cable was loaded with sufficient current passing through each of the conductors connected in series with one another to heat the conductors to a temperature of 125° C. This current was maintained for a total of 200 hours, and samples of the cable were removed for testing after 100 hours and after 200 hours. The rubber compound of each conductor, which had already been subjected to double vulcanization as noted hereinbefore, was tested for tensile strength and elongation. The results of these tests, compared with the initial physical properties of the rubber compound before the test, are given in Table I.

As a further illustration of the heat-stability of the new rubber composition, samples of the original cable were placed in an oven having an air atmosphere heated to a temperature of 125° C. Sections of the cable were removed for testing after being heated to this temperature for 100 hours, 200 hours, and 300 hours, respectively. Comparison of the physical properties such as tensile strength and elongation of these sections with the original properties of the rubber composition is made in Table II.

*Table I*

| Insulation | Initial | | After 100 hrs. at 125° C. | | After 200 hrs. at 125° C. | |
|---|---|---|---|---|---|---|
| | Tensile, lbs./sq. in. | Elong., per cent | Tensile, lbs./sq. in. | Elong., per cent | Tensile, lbs./sq. in. | Elong., per cent |
| White | 1,264 | 359 | 1,292 | 362 | 1,385 | 375 |
| Red | 1,278 | 371 | 1,442 | 383 | 1,372 | 381 |
| Gray | 1,333 | 354 | 1,320 | 356 | 1,370 | 367 |

*Table II*

| Insulation | Initial | | After 100 hrs. at 125° C. | | After 200 hrs. at 125° C. | | After 300 hrs. at 125° C. | |
|---|---|---|---|---|---|---|---|---|
| | Tensile, lbs./sq. in. | Elong., per cent | Tensile, lbs./sq. in. | Elong., per cent | Tensile, lbs./sq. in. | Elong., per cent | Tensile, lbs./sq. in. | Elong., per cent |
| White | 1,264 | 359 | 1,337 | 360 | 1,178 | 342 | 1,200 | 329 |
| Red | 1,278 | 371 | 1,346 | 370 | 1,363 | 343 | 1,180 | 346 |
| Gray | 1,333 | 354 | 1,348 | 346 | 1,258 | 325 | 1,152 | 337 |

The data in Tables I and II show that a rubber composition made in accordance with my invention does not undergo any substantial degradation or deterioration in its physical characteristics when heated to the unusually high temperature of 125° C. for a period as long as 300 hours. Moreover, the rubber composition thus heated showed no apparent loss in its insulating or other electrical properties. The rubber composition was highly flame-resistant when tested with an open flame and met the highest standards now recognized as practical in this respect. The exceptional thermal stability of the new rubber compositions makes it possible to operate continuously with these compositions for an unlimited period of time at a temperature well above 75° C. and generally as high as 90° C. Continuous operation at even higher temperatures is possible with many rubber compositions made in accordance with the invention. These novel rubber compositions represent a marked advance over the most stable rubber compositions known heretofore, which, as hereinbefore stated, are capable of continuous operation at temperatures no higher than about 75° C., and which at best are capable of safe operation at a temperature of 100° C. for not more than a total of about one week per year.

I claim:

1. An insulated electric conductor comprising a metallic conductor having an insulation capable of continuous operation at temperatures up to 90° C. and of emergency operation for short intervals at temperatures up to 125° C. and comprising a rubber composition containing in intimate association therewith from 10 to 25% by weight of a halogenated diphenyl having a softening point upwards of 250° C. and from 2 to 15% by weight of a plasticizing halogenated diphenyl having a softening point in the range 50° C. to 100° C.

2. An insulated electric conductor comprising a metallic conductor having an insulation capable of continuous operation at temperatures up to 90° C. and of emergency operation for short intervals at temperatures up to 125° C. and comprising a rubber composition containing intimately dispersed therein about 15–25% by weight of a halogenated diphenyl having a softening point in the range 275° C. to 310° C. and from 2 to 15% by weight of a plasticizing halogenated diphenyl having a softening point in the range 50° C. to 100° C.

3. An insulated electric conductor comprising a metallic conductor having an insulation capable of continuous operation at temperatures up to 90° C. and of emergency operation for short intervals at temperatures up to 125° C. and comprising a rubber composition containing intimately dispersed therein from 10 to 25% by weight of a chlorinated diphenyl having a softening point in the range 275° C. to 310° C. and from 2 to 15% by weight of a plasticizing chlorinated diphenyl having a softening point in the range 55° C. to 90° C.

4. An insulated electric conductor comprising a metallic conductor having an insulation capable of continuous operation at temperatures up to 90° C. and of emergency operation for short intervals at temperatures up to 125° C. and comprising a rubber composition containing intimately dispersed therein from 10 to 25% by weight of a chlorinated diphenyl having a softening point of about 294–300° C. and from 2 to 15% by weight of a plasticizing chlorinated diphenyl having a softening point of about 70–77° C.

5. Electric insulation capable of operating at temperatures up to 90° C. for prolonged periods of time without substantial deterioration comprising a rubber composition containing in intimate association therewith from 10 to 25% by weight of a halogenated diphenyl having a softening point in the range 275° C. to 310° C. and from 2 to 15% by weight of a plasticizing halogenated diphenyl having a softening point in the range 50° C. to 100° C.

6. Electric insulation capable of operating at temperatures up to 90° C. for prolonged periods of time without substantial deterioration comprising a rubber composition having intimately dispersed therein from 10 to 25% by weight of a chlorinated diphenyl having a softening point in the range 275° C. to 310° C. and from 2 to 15% by weight of a chlorinated diphenyl plasticizing agent having a softening point in the range 55° C. to 90° C.

7. Electric insulation capable of operating at temperatures up to 90° C. for prolonged periods of time without substantial deterioration comprising a rubber composition having intimately dispersed therein from 10 to 25% by weight of a chlorinated diphenyl having a softening point of about 294–300° C. and from 2 to 15% by weight of a chlorinated diphenyl plasticizing agent having a softening point of about 70–77° C.

SAMUEL J. ROSCH.

REFERENCES CITED

The following references are of record in the file of this patent:

UNITED STATES PATENTS

| Number | Name | Date |
|---|---|---|
| 2,291,988 | Sibley | Aug. 4, 1942 |
| 2,142,039 | Abrams | Dec. 27, 1938 |
| 2,143,470 | Becker | Jan. 10, 1939 |
| 2,182,667 | Kaimer | Dec. 5, 1939 |
| 1,863,147 | Young | June 14, 1932 |
| 2,028,716 | Delaney | Jan. 21, 1936 |
| 2,028,715 | Hanson | Jan. 21, 1936 |

FOREIGN PATENTS

| Number | Country | Date |
|---|---|---|
| 845,734 | France | May 22, 1939 |

Certificate of Correction

Patent No. 2,416,955. March 4, 1947.

SAMUEL J. ROSCH

It is hereby certified that errors appear in the printed specification of the above numbered patent requiring correction as follows: Column 3, line 9, for "40–60%" read *40–65%*; lines 64 and 65 for "incorporating" read *incorporation*; and that the said Letters Patent should be read with these corrections therein that the same may conform to the record of the case in the Patent Office.

Signed and sealed this 13th day of May, A. D. 1947.

[SEAL]

LESLIE FRAZER,
*First Assistant Commissioner of Patents.*